June 5, 1934.     R. R. DONALDSON, JR     1,961,343
CONTROL SYSTEM FOR FURNACES
Filed July 12, 1933     3 Sheets-Sheet 3
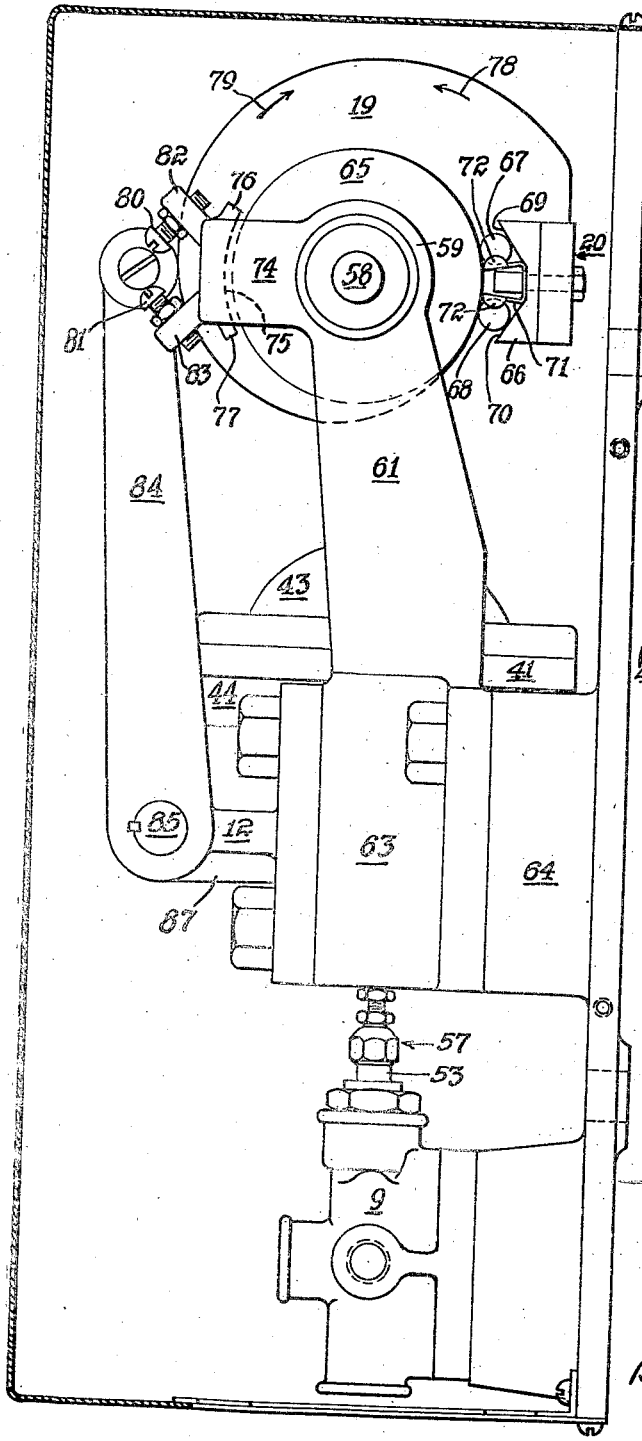
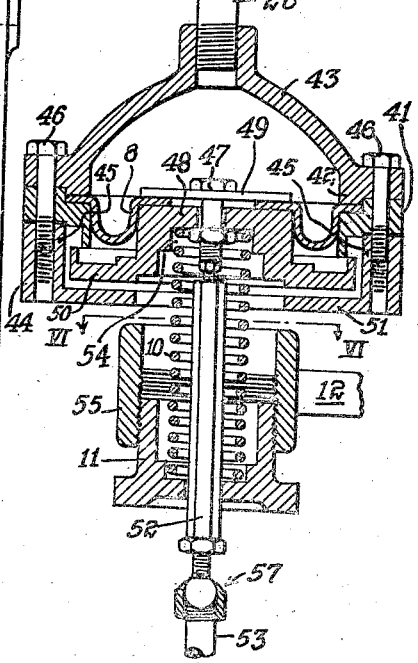
Fig. 5.
Fig. 4.
INVENTOR
Robert R. Donaldson, Jr.
By Green & McCallister
His Attorneys Patented June 5, 1934

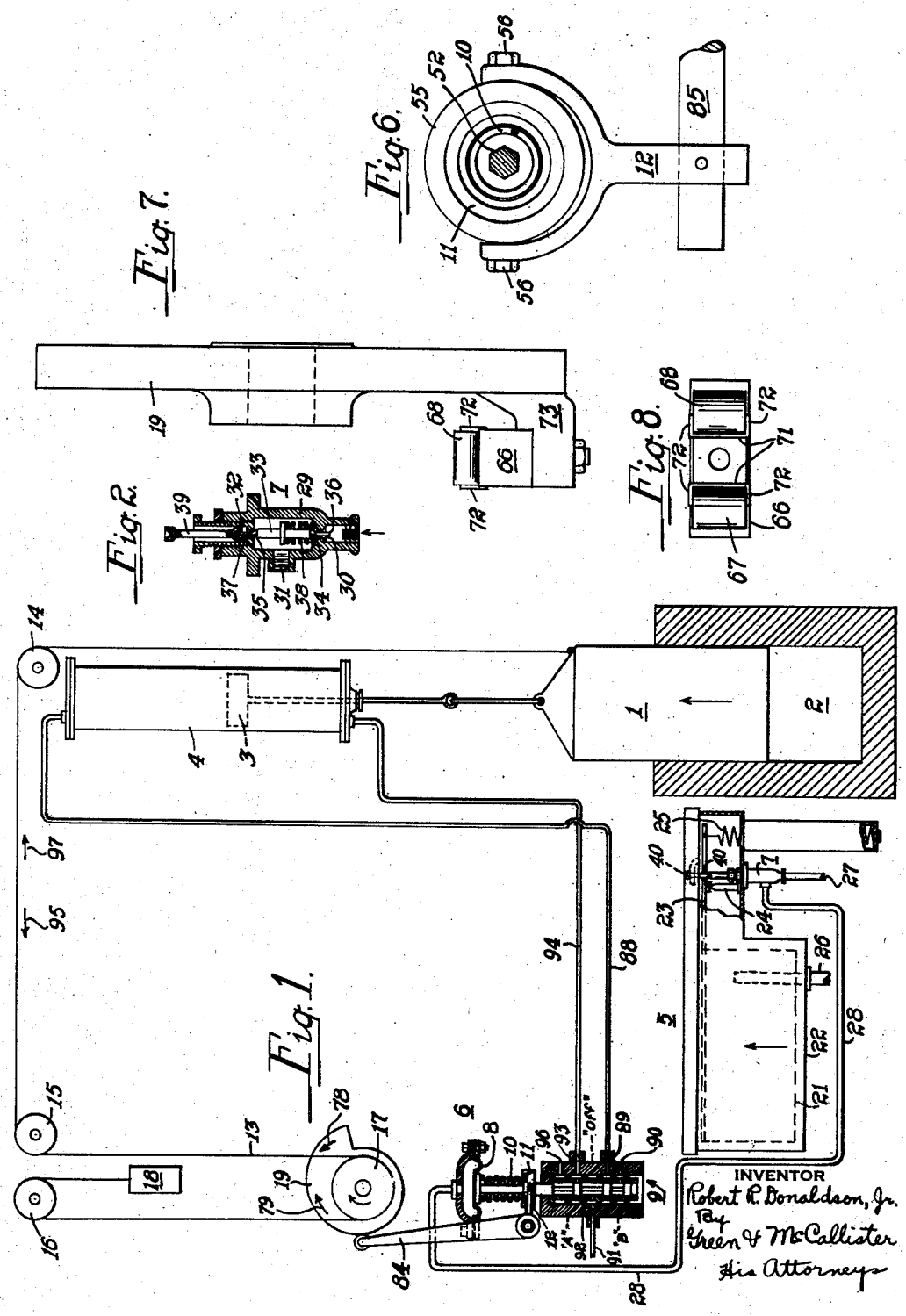

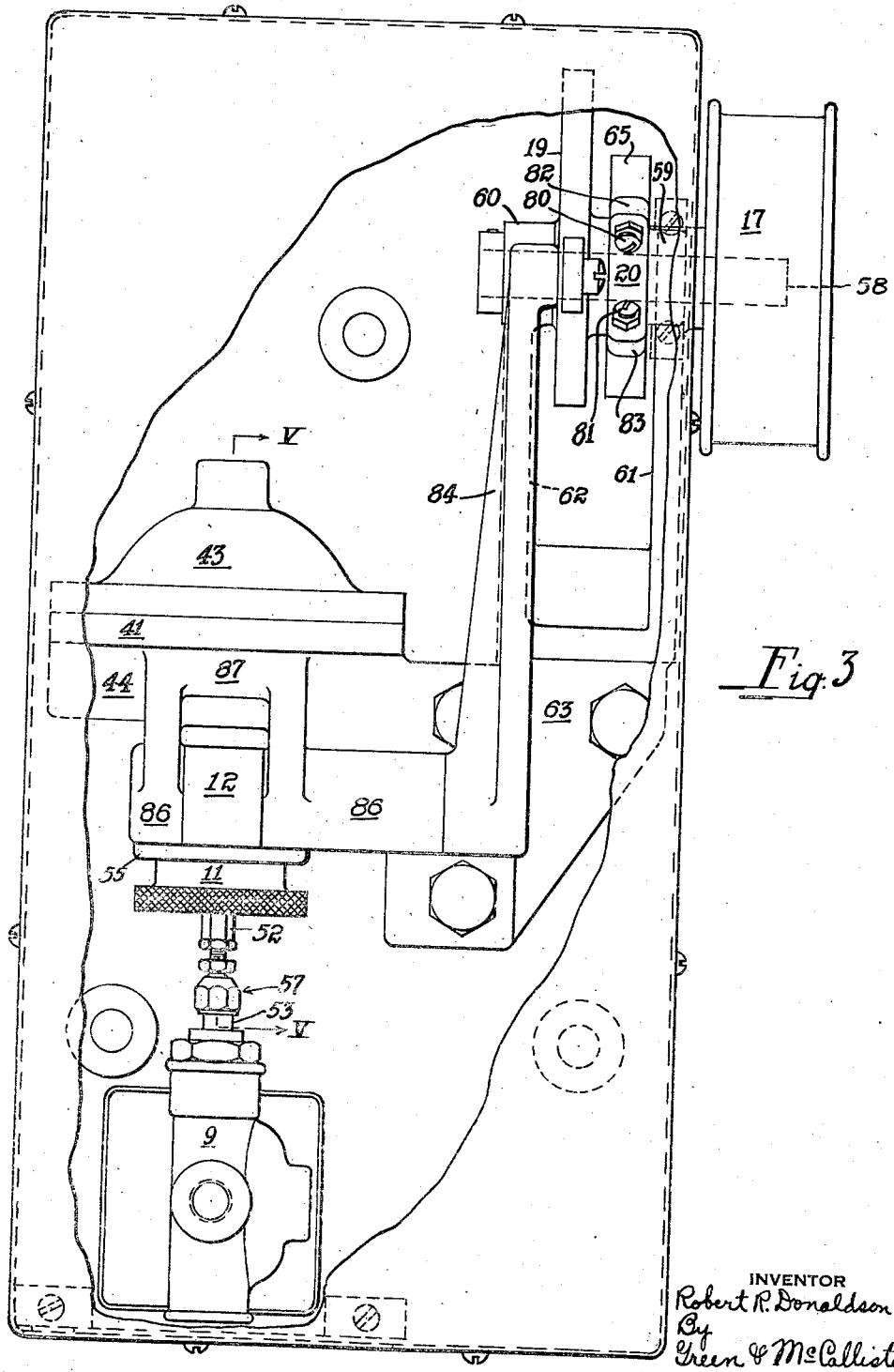

1,961,343

UNITED STATES PATENT OFFICE 1,961,343

CONTROL SYSTEM FOR FURNACES

Robert R. Donaldson, Jr., Pittsburgh, Pa., assignor to John M. Hopwood, Dormont, Pa.

Application July 12, 1933, Serial No. 680,097

13 Claims. (Cl. 236—85)

This invention relates to apparatus for obtaining close regulation of the drafts of furnaces, and more particularly to apparatus for controlling the adjustment of dampers having a wide range of travel between open and closed position.

The draft of various types of furnaces is, in many cases, controlled in accordance with the pressure in the combustion space or in a passage connecting the outlet of the furnace to the stack. It is usually desirable to maintain the pressure, at any given point, whether in the combustion space of the furnace or in the passage leading from the outlet of the furnace to the stack, substantially constant, and this is accomplished by adjusting a damper in the outlet passage in accordance with variations in the pressure at the particular point selected.

The control apparatus embodying this invention is particularly suitable for actuating dampers of metallurgical furnaces, such as open hearths. The outlet dampers for such furnaces are usually large and heavy and have a wide range of travel between open and closed position. The adjustment of the damper may be obtained with various types of motors, but in order to secure accurate control, it is desirable to employ either a pneumatic or hydraulic power cylinder provided with a piston having a stroke commensurate with full range of the damper travel. The damper may therefore be directly connected to the piston so as to avoid the use of motion multiplying mechanism and thereby eliminate the errors which would arise incident to errors which would be occasioned by such mechanism.

In accordance with this invention, it is proposed to control the movement of the piston by means of a pressure sensitive device that will have sufficient travel, in response to slight pressure variations either in the furnace or the outlet passage, to operate a pilot valve or other device. This pilot valve, in turn, is utilized to control the operation of a pressure operated valve that controls the movement of the piston of the power cylinder.

Under ordinary circumstances, the operating range of a pressure sensitive device of the type referred to above, would be effective to control the operation of a power cylinder having a piston stroke of ten or twelve inches but would be entirely inadequate to control a power cylinder having a stroke of five or six feet. On the other hand, if the pressure sensitive device were designed with a sufficient operating range to control a power cylinder having a long stroke, the device would be impractically large and cumbersome and of impaired sensitivity.

It is an object of this invention to provide for controlling the operation of a long stroke power cylinder having a piston connected to a damper or other draft regulating device whereby the piston may be regulated in incremental steps throughout successive zones or ranges, to compensate for variations in conditions affecting the furnace draft, and whereby the transition from one zone to another may be brought about when the allowable range of pressure variation acting on the pressure sensitive device has been or is about to be, exceeded.

Another object of the invention is to make provision for so fixing the limits of the operating zones above-mentioned, that the pressure sensitive device may provide accurate and close regulation of the power cylinder throughout a given range or zone of piston travel that is commensurate with the operating range of the pressure sensitive device.

A further object of the invention is the provision of a diaphragm operated valve for controlling a power cylinder, and means for varying the resistance to movement of the diaphragm in accordance with the pressure acting thereon.

Other objects of the invention will, in part, be apparent and will, in part, be obvious from the following description taken in conjunction with the accompanying drawings, in which:

Figure 1 is a more or less diagrammatic view of a furnace damper operated by a power cylinder, and a control system therefor embodying one form of the invention, whereby accurate adjustments of the damper may be obtained throughout successive zones of travel;

Fig. 2 is a view in section of the pilot valve forming part of the pressure sensitive device embodied in the control system of Fig. 1;

Figs. 3 and 4 are assembled views in front and side elevation, respectively, of a device, embodied in the system of Fig. 1, which controls the operation of the power cylinder;

Fig. 5 is a view in section of a valve operating mechanism taken on line V—V of Fig. 3;

Fig. 6 is a view in section of the same device taken on line VI—VI of Fig. 5;

Fig. 7 is a view in side elevation of a cam and a clutch detail embodied in the device of Figs. 3 and 4; and Fig. 8 is a top plan view of the clutch detail shown on the cam of Fig. 7.

Throughout the drawings and the specification like reference characters indicate like parts.

In Fig. 1 of the drawings, a damper 1 located in a duct or passage 2 is illustrated. The duct or passage 2 may be considered as connecting the outlet of a furnace (not shown) with a stack (not shown) and the damper may be considered as being of the type having a wide operating range between open and closed positions. In some cases, a damper of this type may, for example, have a travel of five or six feet.

The damper is directly connected to a piston 3 of a power cylinder 4 having a stroke commensurate with or equal to the travel or operating range of the damper. This damper is utilized to control the draft of the furnace and is shifted or adjusted in such fashion that the pressure, either in the combustion space of the furnace or in the portion of the duct 2 between the furnace outlet and damper 1, is maintained substantially constant.

The control system illustrated for controlling the direction and extent of movement of the piston of the power cylinder and therefore the position of damper 1, is arranged to function in response to variations in the furnace pressure as a measure of the furnace draft. The system is so arranged that the damper will be shifted into a zone in which the furnace draft may be maintained substantially constant by making relatively fine adjustments of the damper. When the adjustments of the damper in a particular zone are no longer sufficient to maintain the furnace pressure within a given range of variations, the damper is shifted to another zone and again subjected to fine adjustments so that the furnace draft is maintained substantially constant. The damper is thus shifted from zone to zone throughout its full operating range.

The length of travel of the damper in the various zones is made such that the pressure sensitive device of the control system may function within its effective range of operation and provide stable operation of the damper operating motor in each of the various zones. When this range of damper travel in any zone has been reached, the transition occurs, that is, the damper is shifted into another zone that will restore the furnace draft and the pressure effected thereby to approximately the desired value so that the control system may function within the operating range of the pressure sensitive device, and provide accurate damper adjustment within this zone.

The control system comprises a pressure sensitive device 5 that responds to variations of pressure in the furnace chamber or in duct 2; a device 6 controlled jointly by the pressure sensitive device and the piston of the power cylinder for controlling the direction and extent of movement of piston 3 and consequently, the direction and extent of movement of the damper.

The pressure sensitive device operates a pilot valve 7 whereby pressure impulses of varying magnitude, depending on the action of the sensitive device 5, are transmitted to device 6. The device 6 has a diaphragm 8 that responds to these pressure impulses and operates a multiple port pilot valve 9 which controls the admission of motive fluid such as compressed air or water to the power cylinder 4 and therefore controls the piston. Movement of the diaphragm is opposed by a compression spring 10, one end of which bears under the diaphragm and the opposite end of which is disposed in a socket 11 which is fulcrumed in a forked lever 12. When valve 9 is shifted by diaphragm 8 to a certain position, power piston 3 moves in a certain direction. Movement of the power cylinder operates damper 1 and a cable 13 that extends over a series of pulleys 14, 15, and 16, and a clutch pulley 17. This cable is counterweighted as at 18.

As the cable shifts in response to movement of piston 3 and the damper 1, pulley 17 is turned and this pulley drives a cam 19 which is coupled thereto by means of a clutch 20. As cam 19 turns, forked lever 12 is turned in such a direction as to compress spring 10, provided the pressure on the diaphragm is increasing, and return valve 9 to its off position, thereby stopping piston 3 and damper 1. If the pressure acting on diaphragm 8 is reduced, valve 9 is operated to another position causing piston 3 to move in a direction opposite to that which it moved previously, and this movement is translated to pulley 17 and cam 19 causing socket 11 to move downwardly and decrease the spring tension acting on diaphragm 8. When the spring tension is reduced, the pressure delivered to diaphragm 8 by pressure sensitive device 5 will be sufficient to cause the diaphragm to return valve 9 to its off position.

When damper 1 has reached its limit of travel in one direction or the other while operating in a given zone, clutch 20 is disengaged, so that cam 19 will remain stationary, while pulley 17 is free to turn. Since the cam is now inoperative to return valve 9 to its off position, it will remain in one or the other of its positions that permit delivery of pressure or motive fluid to the power cylinder and thereby cause the piston to continue to move until the pressure in duct 2 or in the furnace combustion space has been restored to normal. When restored to normal, pressure sensitive device 5 will operate and cause a pressure impulse to be transmitted to the diaphragm that will operate valve 9 to a position that will effect a reverse movement of the piston.

As soon as the damper movement has been reversed, clutch 20 is re-engaged so that the cam is driven in accordance with the extent and direction of travel of the power cylinder piston and the damper and rendered operative to return valve 9 to its off position in the manner aforesaid. The damper is now in a different position or zone than it was previously and will be regulated in incremental or step-by-step fashion until the limit of the new zone has been exceeded. When this occurs, the transition to another zone takes place.

Thus, the control system provides fine regulation or control of damper 1 throughout successive zones of travel, each zone constituting only a frictional part of the total travel of the damper and the power cylinder which operates the same, and includes means for shifting the position of the damper and the power piston to successive zones, as each preceding zone of travel is exceeded, throughout the full operating range of the power cylinder and the damper.

Pressure sensitive device 5, in view of the function it performs, may be considered as a primary regulator; device 6 may be considered as a combined auxiliary regulator and shifting compensator; and the power cylinder 4 with its piston as a motive means.

Each of these devices will now be described in order.

Pressure sensitive device 5 may take various forms, but for the purpose of draft regulation, where slight pressure variations are utilized to operate the device, a float mechanism is preferred as it is free of friction and can be made to operate through a wider range of travel than a diaphragm or bellows type device, unless special construction is resorted to.

Device 5 comprises a float 21 in the form of a bell which is sealed in a liquid, such as oil or water, carried in a container 22. The float is mounted at one end of a beam 23 which is pivoted on a knife edge 24. The opposite end of the beam is connected to a relatively light tension spring 25 which serves to counterbalance the weight of the float and to add a certain amount of gradient as may be required to stabilize the mechanism. A pipe 26 extends through the bottom of the float chamber and into the float to a point above the liquid level. This pipe is connected either to the furnace chamber or to duct 2 at a point between the outlet of the furnace and the damper. Thus, the float rises with increasing furnace pressure and falls as the pressure decreases, causing the beam to rock on its fulcrum or knife edge 24. Such rocking movements of the beam are utilized to operate pilot valve 7 which in turn transmits pressure impulses from a pressure supply pipe 27 through an impulse line 28, to diaphragm 8 of device 6; the magnitude of which impulses depends upon the position of the float.

The pilot valve comprises a body 29 having an inlet port 30 to which air pressure pipe 27 is connected, an outlet port 31 through which impulses are transmitted to impulse line 28; and, an exhaust port 32. The openings in the inlet and exhaust ports 30 and 32 are controlled by a valve 33 having tapered seats 34 and 35 at opposite ends and guide extension 36 and 37 that extend into these port openings. The valve, as shown, is normally urged away from the inlet port seat and towards the exhaust port seat by means of a compression spring 38. Operative connection between valve 33 and float beam 23 is provided by means of a stem 39. This stem rests on the upper guide extension of valve 33 and the upper end of said stem 39 is disposed under an adjustable pin 40 carried by the float beam. Thus, as float 21 rises, valve 33 is moved downwardly, and rises as the float falls.

If valve 33 is in its lowest position, inlet port 30 is closed and exhaust port 32 is open; therefore, the pressure in valve body 29 and in the impulse line 28 leading to device 6 will be at atmospheric. As valve 33 moves upwardly, in response to decreasing pressures in float 21, air is admitted to valve body 29. At the same time, the exhaust port is being gradually closed so that the magnitude of the pressure within the valve body and consequently within the impulse line 28 rises.

The pressure in impulse line 28 may, therefore, be varied from atmospheric to the value of the pressure in the supply line. The pressure is a maximum within the valve body and the impulse line when exhaust port 32 is completely closed. Therefore, if the exhaust port of the valve is completely closed, and the pressure acting on the interior of float 21 is increasing the valve will move downwardly thereby gradually opening the exhaust port, and gradually closing inlet port 30 so that, as a consequence, the pressure in impulse line 28 and the pressure within the valve body will gradually diminish from a maximum value to atmospheric value when the inlet port is completely closed.

The movement or range of travel required of float 21 to move valve 33 to one or the other of its extreme positions is relatively small and may in some cases be only a quarter of an inch, and for a given size float, sealed in water, a pressure change within the float of say 0.0022 inch of water will produce this amount of travel.

Since in some cases, it is desirable to regulate the furnace pressure within such a range of pressure variation, the travel of the float cannot be increased without exceeding the allowable pressure variation. This amount of travel is sufficient to provide stable operation of a power cylinder having a stroke of ten or twelve inches but would be inadequate to provide stable operation of a power cylinder having a piston stroke of five, six, or more feet such as power cylinder 4.

In order to provide stable operation of a power cylinder having a long piston travel, the pressure impulses are transmitted to the diaphragm of device 6 which as stated previously herein, is provided with a shifting compensator that causes the piston and the damper to move to a position such that the pressure in the furnace at the point of control will be within the allowable variation of say, 0.0022 inch of water. The float may, therefore, operate within its stable range of operation, and effect close, accurate adjustments of the damper within this range.

Device 6 includes the diaphragm 8, the outer edge of which is clamped between a ring 41 and a depending annular shoulder 42 of a bell-shaped member 43 having an inlet to which the pressure impulse line is connected. Ring 41 is mounted on a support 44 having a circular or annular shoulder 45. A plurality of screws 46 extending through an annular flange of the bell-shaped member, and ring 41, have threaded engagement with annular support 44 and provides a means for effecting a pressure tight joint between the outer edge of diaphragm 8 and the depending shoulder 42 of member 43 and ring 41.

The central portion of the diaphragm is apertured to accommodate a through bolt 47 which supports a thrust member 48. The thrust member overlaps the diaphragm aperture on the lower side of the diaphragm, while the upper side of the diaphragm is backed by a plate 49 which spans and overlaps the aperture so that when a nut on bolt 47 is tightened, a pressure tight joint is provided between the plate, diaphragm, and thrust plate.

In order to limit upward movement of the diaphragm to prevent overtravel thereof, clamping ring 41 is formed with a depending annular flange adapted to abut a flange 50 of the thrust member. Downward travel of the diaphragm is limited by an annular flange 51, which is formed as a part of support 44. The end of bolt 47 is tapped to accommodate the threaded shank of a link 52 by which connection is made between diaphragm 8 and stem 53 of pilot valve 9.

Compression spring 10 which is utilized to oppose movement of the diaphragm as the pressure delivered thereto increases, is disposed about link 52 with its upper end nested in a socket 54 formed in thrust member 48. The lower end of the spring is nested in socket 11 which is adjustably threaded into a ring 55. Ring 55 is supported by trunnions 56 carried by forked lever 12. These trunnions permit spring socket 11 to remain in alinement with spring 10 as the angularity of the forked lever changes in response to movement of piston 3 and the damper. The lower end of link 52 has a ball and socket connection 57 with the upper end of the pilot valve stem 53.

Thus, if diaphragm moves upwardly the valve is moved upwardly to a position in which air pressure is delivered from a supply pipe to the lower end of cylinder 4, causing piston to move upwardly. In response to such movement of the piston and the damper, the cam causes the spring socket to lower and thereby decrease the spring tension on the diaphragm so that the pilot valve will be returned to its off position.

The construction of cam 19, clutch 20 by which a driving connection is made between pulley 17 and the cam, the manner in which the cam is caused to operate jointly with the pressure diaphragm 8 in the control of pilot valve 9, and the manner in which the clutch is controlled to effect the transition of piston 3 and damper 1 from one zone to another, when the travel of the cam in one direction or the other has been reached, may best be understood with reference to Figs. 3, 5, 6 to 8, inclusive.

As may be seen in Figs. 3 and 4, cam 19 and the clutch mechanism are mounted on a shaft 58 which is journaled in bearings 59 and 60 formed in uprights 61 and 62 of a bracket 63 which is bolted to a supporting base 64. The cam and clutch mechanism are disposed between these uprights.

One end of shaft 58 projects outwardly from journal 59 of upright 61 and on this projecting portion, pulley 17 is mounted and secured. The cam is mounted to rotate freely on shaft 58 but when clutch mechanism 20 is engaged, turns with the shaft and the pulley.

The clutch mechanism 20 comprises a disc 65 which is secured to shaft 58, a clutch block 66 carried by cam 19 and rollers 67 and 68 which operate between the periphery of the disc and oppositely inclined wedging surfaces 69 and 70 formed on the clutch block. The rollers are urged into wedging engagement between the periphery of the clutch disc and the oppositely inclined surfaces 69 and 70 by means of a U-shaped spring 71, disposed between the rollers. The legs of the U-shaped spring are provided with offsets or ears 72 which engage the opposite ends of the clutch rollers and hold them in operative relation to the inclined wedging surfaces of the clutch block and clutch disc.

As may be seen in Fig. 7, cam 19 is provided with an offset 73 on which clutch block 66 is secured. The offset is so located that clutch rollers 67 and 68 are disposed in the same plane as the periphery of clutch disc 65.

As may be seen in Fig. 4, upright 61 of bracket 63 is provided with an arm 74 that extends outwardly from shaft 58 and is formed by an arcuate segment 75 that is concentric with the clutch disc but in spaced relation thereto. The opposite ends of this segment are formed with projections or stops 76 and 77 adapted to disengage the clutch rollers from the clutch disc when the cam has turned to the end of its travel in one direction or the other.

With reference to Fig. 4, if it be assumed that cam 19 is travelling in the direction of arrow 78, the clutch rollers will maintain a driving relation between clutch block 66 and clutch disc 65 until roller 67 engages projection 76 of segment 75. When this occurs, roller 67 is prevented from moving with the cam so that as the cam continues to move in this direction, the roller is pushed relatively down inclined wedging surface 69, thereby disengaging the driving connection between clutch block 66 and clutch disc 65. Therefore, pulley 17 may continue to travel or turn in the same direction that the cam was turning, but the cam will not turn. If the direction of turning of the pulley is reversed, then roller 68 is wedged between wedging surface 70 of the clutch block and disc 65, so that the cam will travel in the direction of arrow 79. The cam may continue to turn in this direction until projection 77 of segment 75 engages roller 68 and forces it relatively down inclined surface 70, thereby disengaging the driving relation between clutch block 66 and disc 65. Pulley 17 may now continue to turn in the same direction as the cam was turning without turning the cam.

To prevent overtravel of the cam in either direction after one of the clutch rollers has engaged one or the other of the stops 76 and 77 of the segment, adjustable set screws 80 and 81 are provided which are threaded into lugs 82 and 83 of the segments. These set screws are adjusted so as to engage one end or the other of clutch block 66 after disengagement of the clutch has been effected.

Cam 19 operates a lever 84 which is keyed at its lower end to a shaft 85 that is journaled in bearings 86 formed in a support 87; support 87 being bolted to bracket 63. Forked lever 12 which carries spring socket 11 is also secured to shaft 85. The upper end of lever 84 has a roller that follows the surface of cam 19 causing this lever to turn in a clockwise direction as seen in Fig. 4, if the pulley and cam are turning in a clockwise direction. When lever 84 turns in this direction, forked lever 12 swings downwardly so as to lower spring socket 11 and to permit spring 10 to expand and release the tension or force that it exerts on diaphragm 8. If cam 19, pulley 17, and lever 84 are turning counterclockwise, forked lever 12 swings upwardly, compresses spring 10 and increases the tension or force exerted on diaphragm 8. The action of spring 10 on the operation of valve 9 will be apparent from the following description of operation.

The cooperative action of cam 19, clutch 20, forked lever 12, spring 10, and the diaphragm 8 in controlling the operation of valve 9, and consequently the operation of piston 3 and damper 1, may readily be understood from a description of the operation of the system in relation to the pressure acting on float 21.

If it be assumed that with damper 1 occupying a given position, say the position shown in Fig. 1, and cam 19 occupying the position shown in Figs. 1 and 4, the pressure in the furnace is at the desired value. Let it be assumed also that for some reason or other, the furnace pressure is rising above the desired value and that to decrease it, the damper must be adjusted toward open position.

When the pressure in the furnace rises, float 21 rises, valve 33 moves downwardly, and the pressure in impulse line 28 is reduced. Upon a reduction of pressure in the impulse line, diaphragm 8 rises, (there being an unbalance between the force exerted by spring 10 and pressure acting on the diaphragm) causing valve 9 to rise from "off" position to "on" position A. When in this position, the upper end of cylinder 4 is connected to exhaust via pipe 88, and ports 89 and 90 of valve 9 to the atmosphere. The lower end of cylinder 4 is connected to pressure supply line 91 via inlet port 92, outlet port 93, and pipe 94. Thus, piston 3 is caused to rise and open the damper. As the piston and damper move upwardly, counterweight 18 lowers, causing cable 13 to travel in the direction of arrow 95 and turn pulley 17 and cam 19 in a clockwise direction as seen in Figs. 1 and 4. Spring socket 11 is thereby lowered in response to the turning of lever 84 and forked lever 12 so that spring 10 is permitted to expand and decrease the force it exerts on diaphragm 8. The force exerted by the impulse pressure on diaphragm 8 now overbalances the force exerted thereon by spring 10 so that pilot valve 9 is returned to off position, causing piston 3 to stop. If the furnace pressure continues to rise, the impulse pressure continues to decrease, causing the diaphragm to move upwardly and shift the valve 9 again to "on" position A. Again the piston starts to move upwardly, and again valve 9 is returned to "off" position by the action of the cam 19 and the associated mechanism on spring 10 causing the piston to stop.

Thus, it is apparent that each time valve 9 is shifted to "on" position A by diaphragm 8, cam 19 acting through levers 84 and 12 and spring 10, returns the valve to "off" position. Also, each time the valve is returned to off position, a lower impulse pressure on diaphragm 8 is required to operate valve 9 to "on" position A.

Thus, incremental or step-by-step movement of piston 3 and damper 1 will continue, if the furnace pressure continues to rise, until stop 76 engages roller 67 of the clutch. When this occurs, cam 19 is disengaged from pulley 17 so that valve 9 cannot be returned to "off" position after it has been actuated to "on" position A. At this point, the transition, hereinbefore mentioned, occurs, and piston 3 continues to rise and open damper 1 until the pressure in the furnace is overcorrected, that is by being reduced too much. In response to this reduction in pressure, the float 21 falls, valve 33 is raised, increasing the pressure in the impulse line 28 and consequently, increasing the pressure acting on diaphragm 8.

Diaphragm 8 will now move downwardly and shift valve 9 to "off" position and stop piston 3; or, if the furnace pressure drops too much, valve 9 may be actuated to "on" position B by the diaphragm. If actuated to "on" position B, the lower end of cylinder 4 is connected to exhaust via a pipe 94 and ports 93 and 96 to the atmosphere, and the pressure from the supply line 91 is connected to the upper end of the cylinder via ports 92, 89, and pipe 88. The piston will now move downwardly, turn cam 19 counterclockwise, because clutch roller 67 is now operative, and raise spring socket 10. The piston will continue to travel downwardly until the spring is compressed sufficiently to overcome the pressure acting on diaphragm 8 and return valve 9 to "off" position. The damper is now in a different zone than it was before the above-mentioned transition took place.

If the furnace pressure starts to rise again, the above-described operation will be repeated, and the damper will move upwardly step-by-step until stop 76 disengages clutch roller 67 from clutch disc 65.

If it be assumed that the pressure, in the furnace, to be controlled is below the value desired, then it follows that damper 1 must be shifted towards closed position.

In response to a reduction in furnace pressure, float 21 falls and valve 33 rises, causing the pressure delivered to the impulse line 28 to increase. Upon an increase in pressure, diaphragm 8 actuates valve 9 to "on" position B, admitting fluid pressure to the upper end of the cylinder 4 and causing piston 3 to move downwardly. When the piston moves downwardly, cable 13 travels in the direction of arrow 97, turning pulley 17 and cam 19 in a counterclockwise direction. Such turning of the cam causes spring socket 11 to rise, compress spring 10 and increase the force exerted thereby on diaphragm 8. This force, when it overcomes the force of the pressure acting on the diaphragm, returns valve 9 to its "off" position. If the furnace pressure continues to fall, the pressure acting on diaphragm 8 will be further increased causing the valve again to be moved to on position B, whereby the damper is moved still further towards closed position. As the damper moves towards closed position, cam 19 advances further in a counterclockwise direction, causing the pressure exerted by spring 10 on diaphragm 8 to increase still further and again return valve 9, to its off position. This action will continue, provided the furnace pressure tends to decrease, until the cam has travelled to the end of its limit in a counterclockwise direction. When this occurs, stop 77 engages clutch roller 68 whereby the cam is disconnected from pulley 17. When this occurs, forked lever 12 cannot be raised so that valve 9 will remain in its "on" position B, and cause piston 3 and damper 1 to continue towards closed position until the draft is overcorrected by being increased too much. When this occurs, float 21 will rise and effect a reduction in the pressure acting on diaphragm 8. Such a reduction causes spring 10 to overcome the force exerted by the impulse pressure on diaphragm 8 and return valve 9 to its off position, provided the furnace pressure has not increased too much. But, if the furnace pressure has increased too much, spring 10 will shift valve 9 to "on" position A, causing piston 3 to move upwardly. The piston and damper will continue to move upwardly until clutch mechanism 20 has functioned through spring 10 to return valve 9 to its off position. The damper is now in a different zone than it was before the transition occurred (the transition occurred when stop 77 engaged clutch roller 68 and disengaged the cam 19 from the pulley 17). Piston 3 and damper 1 will now be controlled in step-by-step fashion until the limit of the cam travel is again exceeded.

From the above description it will be apparent that cam mechanism 20 and spring 10 give to diaphragm 8 a positive gradient. That is, if the pressures acting on the diaphragm tend to increase the force exerted by the spring on the diaphragm increases. Therefore, each succeeding time valve 9 is operated by the diaphragm and returned by spring 10, a higher impulse pressure is required to overcome the force of the spring. A similar action occurs if the pressure impulses acting on the diaphragm tend to decrease, that is, each succeeding operation of valve 9 requires a lower pressure on the diaphragm. By giving to diaphragm 8 a positive operating gradient, accurate and stable operation of motive devices, such as the power cylinder illustrated, may be obtained; and by rendering the gradient producing means inoperative under certain conditions, the shifting action of the power means and apparatus operated thereby may be had. In the instant case, this shifting action provides zone control of the power cylinder and damper with accurate and stable regulation thereof in each zone.

The above-described cases of operation have presupposed that the furnace pressure was either continually rising or continually falling. However, it will be apparent that if the damper is in a given zone, the shifting compensating mechanism or device 6 as controlled by pressure sensitive device 5, is effective to cause the damper to be adjusted step-by-step in either direction until the cam reaches the limits of its travel in either direction as determined by stops 76 and 77.

In practice, the amount of travel that cam 19 may make in either direction before engaging one or the other of stops 76 and 77 is made proportional to the range of piston travel that can be accurately controlled by pressure sensitive device 5 while operating within its range of operation. Cam 19, therefore, fixes the limits or extent of travel of the damper 1 and piston 3 in any given zone, or before the transition occurs.

Thus, if pressure sensitive device 5, when operating within its normal range of operation, is capable of accurately controlling the movement of piston 3 within a range of travel of say, ten or twelve inches, cam 19 is designed to permit step-by-step movement of the damper within such a range of travel, and when this range has been exceeded in either direction the clutch stops 76 and 77 cause the transition to take place so that the damper will be shifted into another zone in which step-by-step control of the piston and the damper may be obtained within the operating range of the pressure sensitive device.

In the system illustrated and described, a damper provides the draft regulation, but it will be apparent that where a forced draft fan or blower is employed, draft regulation may be attained by regulating the speed of such blower or fan. Thus, if the fan or blower be driven by an adjustable speed direct current motor, for example, and the speed thereof is adjusted by means of a field rheostat, having a wide range of travel, piston 3 of the power cylinder may be connected to the rheostat. When so connected, fine adjustments of the rheostat, with correspondingly fine adjustments of the motor and fan speed may be attained. The control system would function to shift the rheostat to that part of its operating range in which this fine or step-by-step adjustment would result in the maintenance of the draft at the desired value.

While various modifications and changes may be made in the system as a whole and in the component parts or apparatus thereof, without departing from either the spirit or the scope of the invention, it is to be understood that only such limitations shall be placed on the invention as are imposed by the prior art and the appended claims.

What I claim as new and desire to secure by Letters Patent is:

1. A regulator having a movable member actuatable by a pressure medium and adapted for wide range travel, a pilot valve adapted to control the delivery of fluid to the regulator in accordance with a condition to be controlled so as to cause it to move in one direction or another, means having an operative connection with the movable member and pilot valve adapted to effect step-by-step control of the regulator member throughout a predetermined zone of travel, and means adapted to cause said regulator to shift to a different zone of travel when the movement of the regulator has exceeded the limits of any preceding zone.

2. In combination with a furnace damper adapted for wide range travel for maintaining the furnace draft within predetermined limits in accordance with variations in the furnace pressure, a regulator for operating the damper, a pressure sensitive device adapted for full range travel in response to the draft varying between said limits, the range of travel of said device being small compared to the range of travel of said damper, means controlled jointly by said sensitive device and the regulator for effecting step-by-step movement of the regulator through successive zones of travel, and means causing the transition from one zone to another to take place when the furnace draft departs from the range defined by said predetermined limits, whereby the damper will be shifted to such a zone and be adjusted step-by-step therein as will cause the furnace draft to be maintained within said limits.

3. In combination a pressure sensitive device adapted to respond to a variable to be controlled, and having a relatively small range of travel, a regulator adapted for a wide range of travel compared to the travel of the pressure sensitive device, and means operated under the joint control of said device and regulator adapted to effect step-by-step movement of the regulator through successive zones of travel, each zone of travel being less than the total travel of the regulator and means for causing the transition from one zone to another to take place when the limits of the range of travel of said device has been reached.

4. The combination with a damper and a regulator for moving the damper in either direction, means responsive to a variable to be controlled by the damper for operating the damper step-by-step in either direction throughout a fractional part of the stroke of the regulator, and means for shifting the point in the stroke of the regulator at which step-by-step control is effected whenever movement of the regulator exceeds the limit of said fractional part travel in either direction.

5. The combination with a pressure sensitive device having means for transmitting pressure impulses that vary in magnitude with the magnitude of the pressures acting on said device, and a regulator having a movable member adapted to travel between two extreme positions, of a valve arranged to deliver pressure medium to the regulator and cause the movable member thereof to move towards one or the other of said extreme positions, a yieldable diaphragm adapted to receive the pressure impulses transmitted by said transmitting means and operate the valve, means operated in accordance with the extent and direction of movement of the regulator adapted to so augment the effect of the pressure impulses on the diaphragm as to cause the valve to be operated to obtain step-by-step movement of the regulator movable member towards one or the other of said extreme positions, and means for rendering said augmenting means inoperative, when the regulator member has traveled beyond a certain range of travel, and the diaphragm operative to actuate the valve to effect continued movement of the regulator member in the same direction as it was moving until the pressure sensitive device operates the valve to reverse the movement of said movable member at which time the augmenting means becomes operative to again effect step-by-step movement of the regulator.

6. In combination with a regulator having a movable member actuatable by a fluid medium, and a valve having two "on" positions and an "off" position for controlling the admission of fluid to one side or the other of said member depending on the direction in which it is required to move, of a pressure sensitive diaphragm adapted to operate the valve to one or the other of its "on" positions, a hinged support, a spring yieldingly connected to said diaphragm and support, and a reversibly rotating cam connected to said hinged support and operated by said movable member for so shifting the support as to adjust the tension of the spring and effect a return of the valve to "off" position in response to movement of said member in one direction or another after each operation of the valve to one or the other of its "on" positions.

7. In combination with a regulator having a movable member actuatable by a fluid medium, and a valve having two "on" positions and an "off" position for controlling the admission of fluid to one side or the other of said member depending on the direction in which it is required to move, of a pressure sensitive diaphragm adapted to operate the valve to one or the other of its "on" positions, a spring yieldingly connected to said diaphragm, a cam operated by said movable member adapted to so adjust the tension of the spring as to return the valve to "off" position after each operation of the valve to one or the other of its "on" positions, and means which when said movable member has traveled beyond predetermined limits in either direction render inoperative the cam for causing the spring to return the valve to "off" position and allow continued movement of said movable member until the diaphragm operates the valve to such a position as to arrest and reverse the movement thereof, at which time the cam is again rendered operative to vary the tension of the spring.

8. In combination with a regulator having a movable member actuatable by a fluid medium, and a valve having two "on" positions and an "off" position for controlling the admission of fluid to one side or the other of said member depending on the direction in which it is required to move, of a pressure sensitive diaphragm adapted to operate the valve to one or the other of its "on" positions, and a shifting compensator device operated by said movable member adapted to augment the action of the diaphragm on said valve and effect step-by-step movement of the movable member in a mobile zone, the extent of step-by-step movement in any portion of said zone being only a fractional part of the total range of travel of said member.

9. The combination with a draft regulating element, of means for adjusting said element step-by-step in either direction, throughout zones constituting but a fractional part of the total travel of the draft regulating element, in response to variations in draft, and means for shifting said regulating element to such a zone in the range of travel thereof that step-by-step control thereof will render the draft regulating element effective to maintain the draft at a predetermined value.

10. The combination with a regulator for operating a draft controlling device, of means responsive to variation in draft for causing said regulator to adjust said device step-by-step through successive zones of travel in either direction, each zone of travel being less than the total travel of said device, and means for shifting said device to such a zone as will render step-by-step control of said device effective to maintain the draft at the desired value.

11. The combination with a draft regulating device, and a motive device for operating the regulating device in either direction, means responsive to a variable to be controlled for operating the draft regulating device step-by-step throughout a fractional part of the total travel thereof, and means for shifting the point in the travel of said regulating device at which step-by-step operation thereof by the motive device is effected, whenever the movement of said regulating device exceeds the limit of said fractional part travel in either direction.

12. In combination, a pressure sensitive device adapted to respond to a variable to be controlled, and having a relatively small range of travel, a draft regulating device having a wide range of travel compared to the travel of the pressure sensitive device, and means operated under the joint control of said pressure sensitive device and draft regulating device adapted to effect step-by-step movement of the regulating device through successive zones of travel in either direction, and means for causing the transition from one zone to another to take place when the limits of the range of travel of said sensitive device has been reached.

13. A regulator responsive to a variable to be controlled, a motive device under the control of said regulator, said device having a movable member for adjusting the magnitude of said variable to be controlled, and means operating in conjunction with said motive device and said regulator providing automatic mobile zone control of the movable member, said motive device having more than two positions of rest in said zone but no positions of rest outside said zone except at the limits of the stroke of the movable member.

ROBERT R. DONALDSON, Jr.